US005622516A

United States Patent [19]
Baggett et al.

[11] Patent Number: 5,622,516
[45] Date of Patent: Apr. 22, 1997

[54] INSULATION DISPLACEMENT TERMINAL WITH TWO-WIRE INSERTION CAPABILITY

[75] Inventors: William C. Baggett, Duluth, Ga.; Golam M. Choudhury, Warren; Michael G. German, Secaucus, both of N.J.; Dianne W. Gilland, Lawrenceville, Ga.; Andrew Schwartz, Morris Township, Morris County; Jeremia P. Starace, Nutley, both of N.J.; Wayne D. Larsen, Indianapolis, Ind.

[73] Assignee: Lucent Technologies Inc., Murray Hill, N.J.

[21] Appl. No.: 442,903

[22] Filed: May 17, 1995

[51] Int. Cl.⁶ .................................................. H01R 4/24
[52] U.S. Cl. ........................... 439/408; 439/395; 439/922
[58] Field of Search ................................. 439/408, 404, 439/405, 395, 922, 532, 709, 717

[56] References Cited

U.S. PATENT DOCUMENTS

| Re. 31,714 | 10/1984 | Knickerbocker | 439/408 |
|---|---|---|---|
| 3,798,587 | 3/1974 | Ellis, Jr. et al. | |
| 4,171,857 | 10/1979 | Forberg et al. | |
| 4,283,103 | 8/1981 | Forberg et al. | |
| 4,436,360 | 3/1984 | Knickerbocker | 439/404 |
| 4,871,330 | 10/1989 | Muller et al. | 439/709 |
| 4,950,177 | 8/1990 | Szczesny | 439/404 |
| 5,364,288 | 11/1994 | Drewanz et al. | 439/709 |

FOREIGN PATENT DOCUMENTS

| 2653357 | 6/1978 | Germany | 439/408 |
|---|---|---|---|
| 2017428 | 3/1979 | United Kingdom. | |

*Primary Examiner*—Stephen P. Garbe

[57] ABSTRACT

An insulation displacement connecting (IDC) terminal that accepts two insulated wires in a single slot for the making of an electrical connection. The IDC portion of the terminal, which cuts into the insulation of the wire to establish contact, is designed with large flat spring contacts about a centrally located slot, wherein the contacts displace torsionally when normal forces placed on the terminals exceed a fixed load. The torsional displacement is enabled by the inclusion of a widened slot proximate a base portion of the terminal. The widened slot in combination with an angular orientation of the terminal contained within an insulated connector module housing enables the contacts to twist to away from one another. This displacement effect allows for larger gauge and more than one conductor to be inserted into the terminal without permanently yielding the beam contacts of the terminal. The widened slot included at the base of the terminal also allows for removal of a first wire without disturbing the connection of a second wire. The terminals are adapted for use with connector modules which house multiple pairs of IDC terminals on both the front and rear sides thereof. The connector modules are insertable into a hinged mounting bracket that is mounted at a telephone switching area to make up a modular connecting block.

24 Claims, 5 Drawing Sheets

INSULATION DISPLACEMENT TERMINAL WITH TWO-WIRE INSERTION CAPABILITY

RELATED APPLICATIONS

The present patent application is related to U.S. patent application Ser. No. 08/442,899, entitled Insulation Displacement Contact Including Retention Means, having a filing date of May 17, 1995, that application having a common assignee and one or more common inventors and being incorporated herein by reference.

FIELD OF THE INVENTION

The present invention relates to an insulation displacement connector terminal used for terminating telephone circuit wires, and more particularly to a connector terminal having two-wire insertion capability.

BACKGROUND OF THE INVENTION

Individual pairs of telephone circuit wires are frequently terminated in telephone company central offices, distribution cabinets and customer premise locations utilizing multi-terminal connector blocks. Once terminated, these telephone circuit wires, usually comprised of cables containing narrow gauge copper conductors, are grouped and then rerouted for appropriate distribution of the calls which they carry. Single connector blocks normally accommodate anywhere from 60 to 100 pairs of densely packed terminations, wherein multiple connector blocks are frequently contained close together at a single location, e.g., one wall of a telephone switching room. Efficient utilization of mounting space is thus required since space within utility locations is traditionally at a premium.

In an effort to further maximize the use of space available for telephone circuit connection operations it is often times desirable to make more than one termination at a single terminal of a connecting block. As is known, traditional connecting blocks contain rows of connecting terminals for making terminations, wherein each row of a connecting block includes multiple terminals. The connecting terminals may be in the form of insulation displacement connector (IDC) terminals because of their ease of use, i.e., insulated conductors are not required to be pre-stripped prior to insertion. In this manner multiple terminations can be made more quickly and efficiently.

One drawback with commonly utilized IDC terminals, however, is that they normally do not have the capability to accept more than one conductor wire at a single terminal. Moreover, once terminations are made at an IDC terminal, these terminals may not normally be re-used without a severe degradation in the quality of a subsequent connection.

It is therefore an object of the present invention to provide an insulation displacement connector having the ability to accept and terminate more than one insulated conductor. It is further an object of the present invention to provide a connector wherein terminated wires may be easily removed and the terminal re-used without jeopardizing the integrity of subsequent terminations.

SUMMARY OF THE INVENTION

The present invention is an insulation displacement connecting (IDC) terminal that accepts two insulated wires in a single slot for the making of an electrical connection. The IDC portion of the terminal, which cuts into the insulation of the wire to establish contact, is designed with large flat spring contacts about a centrally located slot, wherein the contacts displace torsionally when normal forces placed on the terminals exceed a fixed load. The torsional displacement is enabled by the inclusion of a widened slot proximate a base portion of the terminal. The widened slot in combination with an angular orientation of the terminal contained within an insulated connector module housing enables the contacts to displace or twist away from one another. This twisting effect allows for larger gauge and more than one conductor to be inserted into the terminal without permanently yielding the beam contacts of the terminal. The widened slot included at the base of the terminal also allows for removal of a first wire without disturbing the connection of a second wire.

The terminals are adapted for use with connector modules which house multiple pairs of IDC terminals on both the front and rear sides thereof. The connector modules are insertable into a hinged or fixed mounting bracket that is mounted at a telephone switching area to make up a modular connecting block. The hinged mounting bracket rotates open at a longitudinal edge to enable access to both front and rear terminals of the connecting modules.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1C:
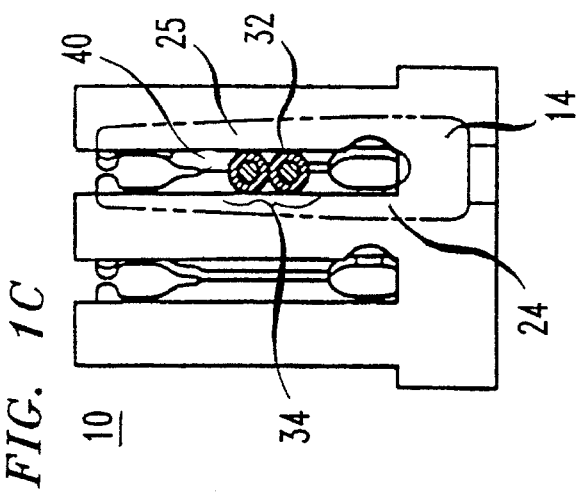
FIG. 1C shows the connector having two wires inserted into the IDC terminal.

The present invention is an insulation displacement connector (IDC) terminal having an ability to retain wires in a parked position prior to insertion. In a preferred embodiment, the terminal is used in a modular connecting block system. Referring to FIG. 1A, there is shown one preferred embodiment of the present invention insulation displacement connector 10. The connector 10 includes a first terminal 12 and second terminal 14 shown within a removable terminal cap element 16. The terminal cap includes cap base (not shown) and three vertical walls 11, 13, 15 wherein the terminals 12, 14 are mounted within a base region 18 of a connector module housing (shown in FIG. 1E). As shown in FIG. 1A, the second terminal 14 is a unitary connecting element having two arms 24, 25 and a slot 26 centrally disposed therein. The base of the terminal 14 couples to a terminal lead 27 or stem which continues into an interior portion of an associated connector module (shown in FIG. 4A). The terminals 12, 14 are essentially identical and are comprised of a resilient conductive material. The terminals 14, 16 may also be plated with suitable elements, such as, gold or silver over nickel plate to prevent corrosion, maintain a gas tight connection and minimize resistance. The two arms 24, 25 of the terminal 14 which define the slot 26 are shaped so as to define a widened slot proximate a top edge of the terminal, hereinafter referred to as the retaining region 28. A second widened slot is located toward the base of the housing 16 and, as will be understood, this second widened slot is referred to as the removal aperture 30.

An insulated conductor 32, for example, of the type used to terminate telephone circuits is shown to be parked within the retaining region 28 for the terminal. The retaining region 28 of the present invention connector is advantageous in that, when desired, individual conductors may be held within the retaining region 28 of the terminal 14 prior to insertion. Accordingly, all conductors may be dressed into the terminal 14 of a connector module as one operation and then seated into the IDC terminals as a second operation. The terminals of the connector 10 are adapted to receive conductor wires of various sizes, e.g., 20–26 AWG, of both a solid and stranded variety. The width of the slot in the retaining region 28 is gradually tapered to widths that are slightly less than the outer diameter of wires to be inserted therein. Also the two arm 24, 25 of the terminal 14 are essentially formed as a spring contact. Thus, varying gauges of wire are held securely in the retaining region 28 prior to termination.

Figure 1B:
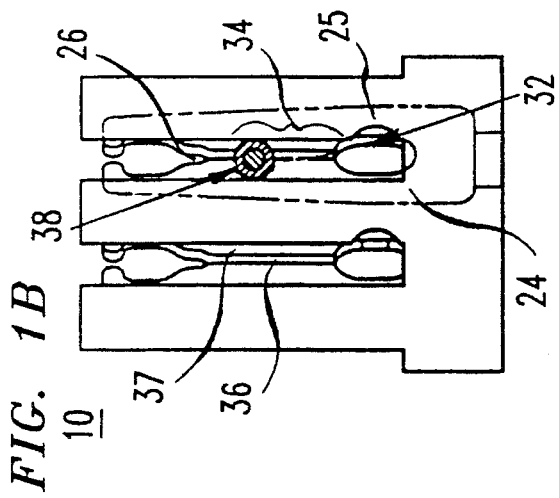
FIG. 1B shows the present invention connector having a wire terminated within the IDC portion of the terminal.

Referring to FIG. 1B, the present invention connector 10 is shown with the conductor wire 32 seated within the IDC portion 34 of the terminal. As will be understood the distance between the arms 24, 25 in the IDC portion 34 of the terminal 14 is less than the minimum diameter of a conductor to be inserted. The inside facing edges 36, 37 of the terminal arms 24, 25 facing the slot 26 terminate with sharpened edges in order that the protective insulation of a conductor inserted at the IDC portion 34 of the terminal will have the insulation cut and/or displaced by the sharpened edges. The conductor 38 contained within the insulated wire 32 will make physical contact with the arms 24, 25 of the terminal 14, thereby producing an electrical connection between the conductor 38 and the terminal 14. It will be noted that each of the arms of the terminal 14 separately cuts into the insulation of the wire 32 to ensure a gas tight connection.

Referring to FIG. 1C, the present invention connector 10 is shown with a second wire 40 inserted into the IDC portion 34 of the second terminal 14. As can be seen, insertion of the second wire 40 pushes the first wire 32 further down within the IDC slot. As with the insertion of the first wire, the insulation of the second wire 40 is also sliced through so that the arms 24, 25 of the terminal 14 make contact with the conductor of the second wire. Accordingly, the present invention connector 10 is capable of terminating two insulated wires within the same terminal 14 of the IDC. Preferably the two conductors will be of the same wire gauge, although depending upon the wire gauges selected, reliable terminations of different sized wires may also be accomplished. It will also be understood that the slot 26 may be tapered so as to balance the forces exerted on the first wire when the second wire is inserted, i.e., the slot closes at the top and therefore forces are normalized on the second wire.

Figure 1E:
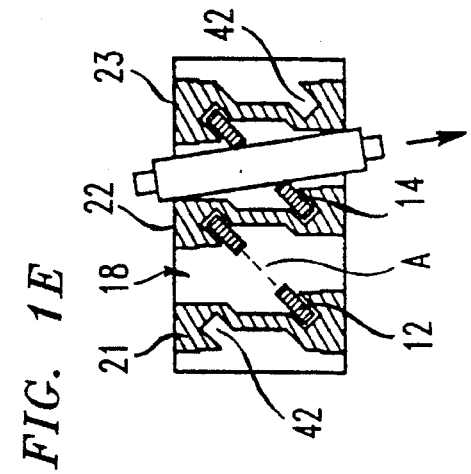
FIG. 1E shows a cross section of the present invention connector along section lines AA of FIG. 1D.
Figure 1A:
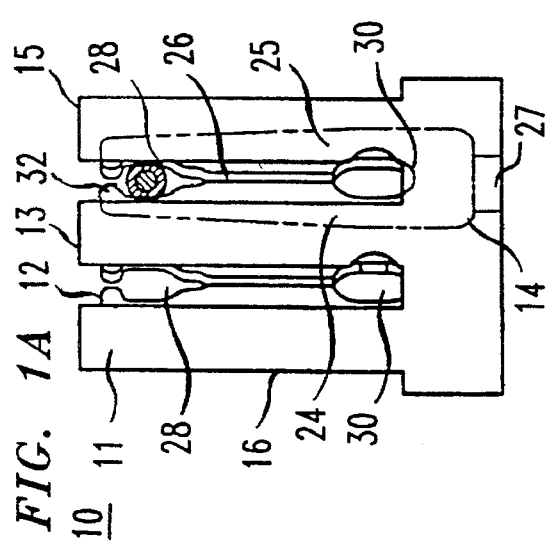
FIG. 1A shows a side view of the present invention insulation displacement connector (IDC) having a wire parked in a retaining slot thereof.
Figure 1D:
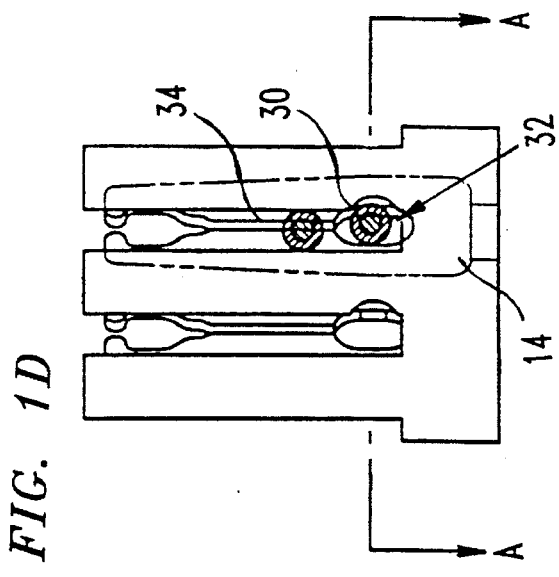
FIG. 1D shows removal of a first inserted wire by means of a removal slot orientated at the base of the IDC terminal.

Referring to FIG. 1D, the present invention connector 10 is shown with the first wire 32 moved down into the removal aperture 30. The removal aperture 30 located at the base region of the terminal 14 is considerably wider than the terminal slot 20 at the IDC region 34. The removal aperture 30 is generally rounded at the ends, having parallel side walls, wherein the middle region is somewhat wider than the outermost diameter of any conductor wire specified for insertion into the connector 10. Since the aperture 30 is wider than the diameter of an inserted conductor wire, a first conductor inserted within the terminal may be slid down through the IDC area 34 into the removal aperture 30 and removed. Removal of a first of two conductors from the IDC terminal 14 is thus accomplished without disturbing or jeopardizing the integrity of the second connection.

FIG. 1E shows a cross section of the present invention IDC connector along section lines AA of FIG. 1D. The cross section view illustrates the formation of vertical walls 21, 22, 23 of the connector module base 18. As can be seen each of the walls 21–23 includes a cavity 42 on either side thereof, which cavity is oriented at an angle A relative a front and rear facing side 44, 46 of the connector module base 18. In a preferred embodiment of the invention the angle A is approximately 45 degrees. The cavities 42 in adjacent walls of the connector 10 form a receptacle within which the terminals 12, 14 may be inserted. It will be noted that the thickness of the vertical walls 21–23 varies toward the center region of the base 18. The thickness of the center portion of a vertical wall 21–23 is approximately ⅓ the thickness of an outer portion of the same vertical wall.

As has been discussed with respect to FIG. 1A, a removal aperture 30 is included proximate the base of the present invention terminal 14. The removal aperture enables somewhat less torsional retaining force to be exerted on the arms 25, 26 of the IDC portion 34 of the terminal 14 from the solid base region of the terminal 14 when certain size wires are inserted. This allows the arms 25, 26 of the terminal to more freely twist under certain circumstances. Thus, the terminal geometry in combination with the difference in vertical wall thickness are important in that arms 25, 26 of a terminal inserted in the housing 16 are enabled to deflect after a predetermined normal force threshold is applied, for example, from an inserted wire. Clearance allows an "in-plane" gap opening to occur before the torsional load is applied. This torsional displacement effect allows larger and/or more than one conductor to be inserted into the terminal 14 without permanently yielding the arms 25, 26 or beams of the terminal. As mentioned, the large flat contacts of the IDC portion 34 of the terminal 14 displace torsionally when normal forces exceed a fixed load. This helps preserve the original structure of the terminal 14 and increase its usable life for subsequent insertions.

Figure 2:
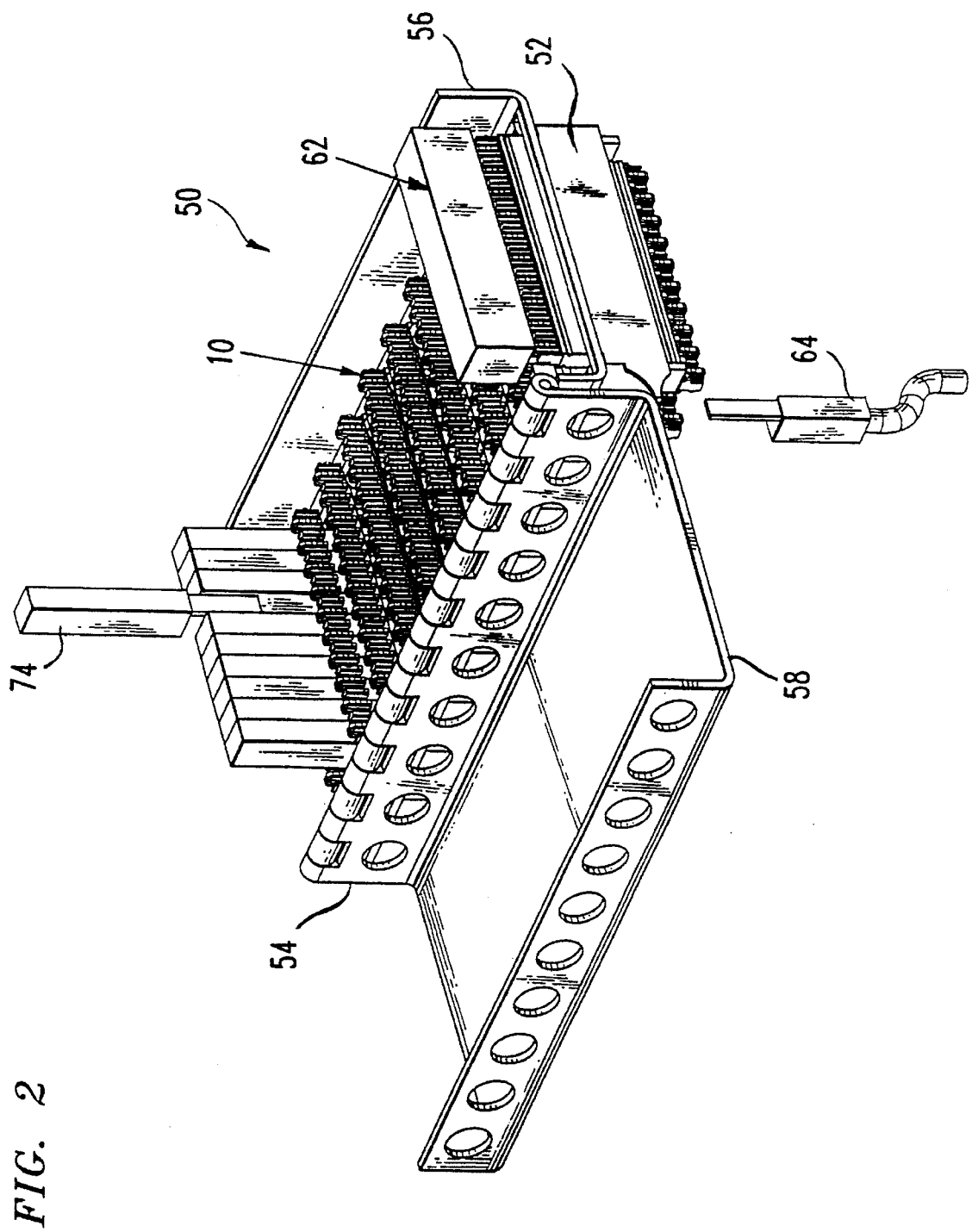
FIG. 2 shows a rear perspective view of one preferred embodiment of a connector block and hinged bracket using the present invention connectors.

Referring to FIG. 2, there is shown one preferred embodiment of a telephone circuit connecting block 50 which utilizes the present invention IDC connector 10. A plurality of present invention connectors 10, for example 8 or 10 pair, are included within a single connector module 52 of the connecting block. Multiple connector modules 52 are inserted into a mounting bracket 54 in order to form the connecting block. IDC terminals 12, 14 are included on both the front and rear sides of each connector module 52, as shown. The mounting bracket 54 is hinged so that a front plate 56 of the bracket which retains the connector modules 52 may rotate open when the rear portion 58 of the bracket is mounted. In the alternative, the front plate may be completely removable. Opening the front plate 56 allows access to the rear terminals of the connecting block 50. For a more detailed description of the hinged mounting bracket see related U.S. patent application Ser. No. 08/442,901, entitled Mounting Bracket For A Connector Block.

FIG. 2 also shows circuit protection modules that can be installed on the connector modules 52. These surge protection modules may utilize gas tubes, solid state (PTC), carbon or other like type devices to provide voltage and current limiting protection. The protection modules are adapted to couple to the mounting bracket 54 to provide a discharge path for electrical surges received at the terminals 12, 14 of a connector. individual pair protection modules 74 are shown, as is a cartridge protection module 62 for protecting all the terminal pairs of a corresponding protection module. A test plug 64 may also be inserted in the front or rear of each of the connector modules. The test plug 64 allows for testing and monitoring of circuits which are terminated at the connecting block 50 without having to disturb any of the terminations on the connecting block.

Figure 3:
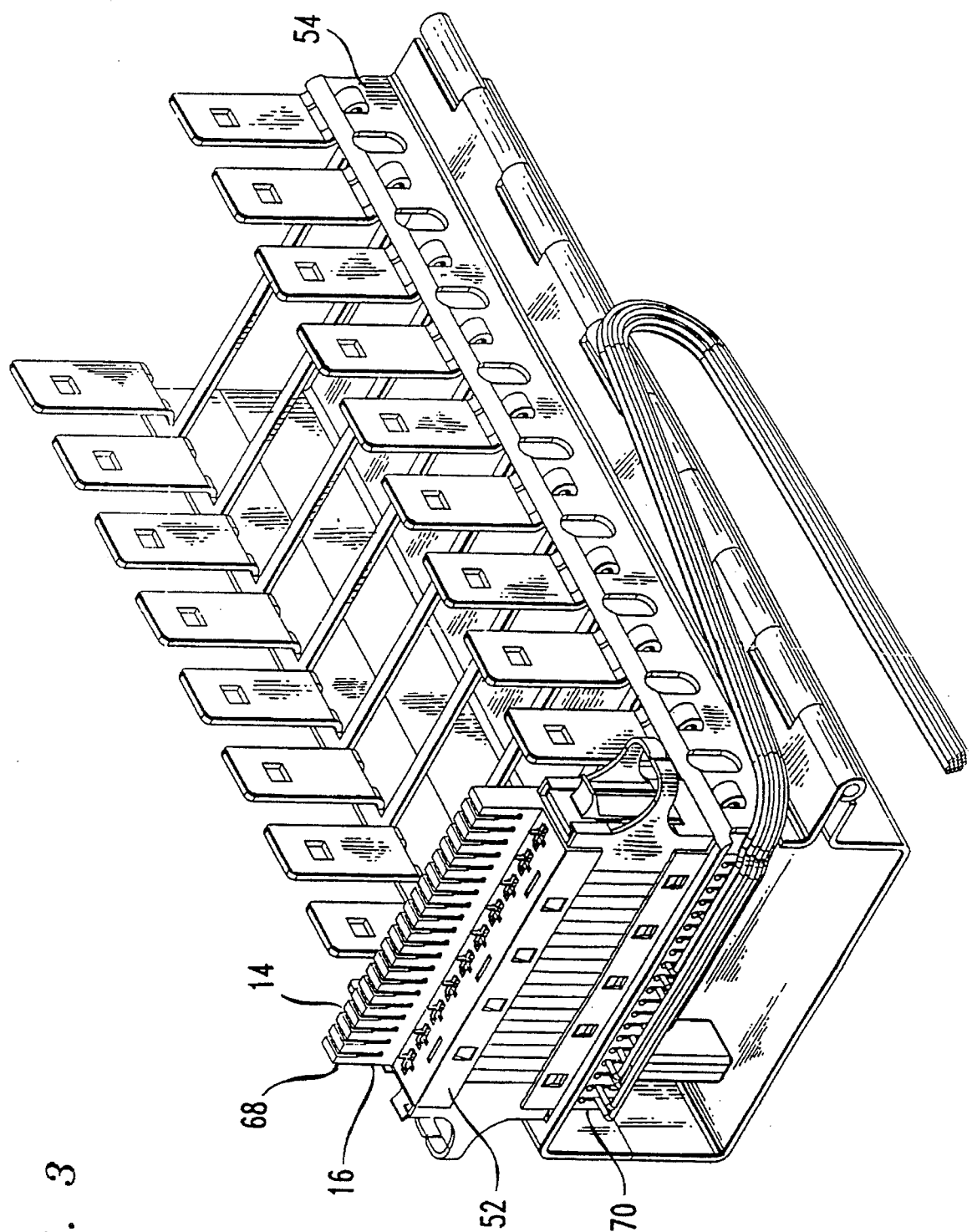
FIG. 3 shows a from perspective view of a hinged mounting bracket having a single connector module with the present invention connectors installed within.

Referring to FIG. 3, a front view of the mounting bracket 54 is shown having a single connector module 52 inserted into a first receptacle slot of the bracket. Cable terminations are shown made at the rear terminals 70 of the connector module 52 which is a preferred manner for dressing wires inserted into the connector block. In this manner the front terminals 68 of the connector modules 52 may be used primarily for cross connections to telephone equipment located on-site. As can be seen, the IDC terminals 14 of the connector module are recessed within the terminal cap 16. This provides a "quiet" front to the module when the terminal cap 16 is installed, in that terminals cannot be hand touched.

Figure 4C:
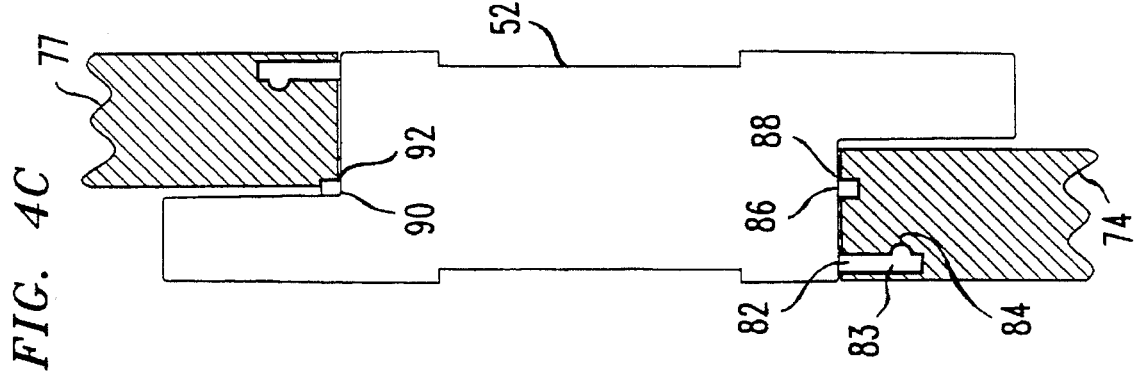
FIG. 4C shows a cross section of the circuit protection as it couples to the connector module and associated ground bar.
Figure 4B:
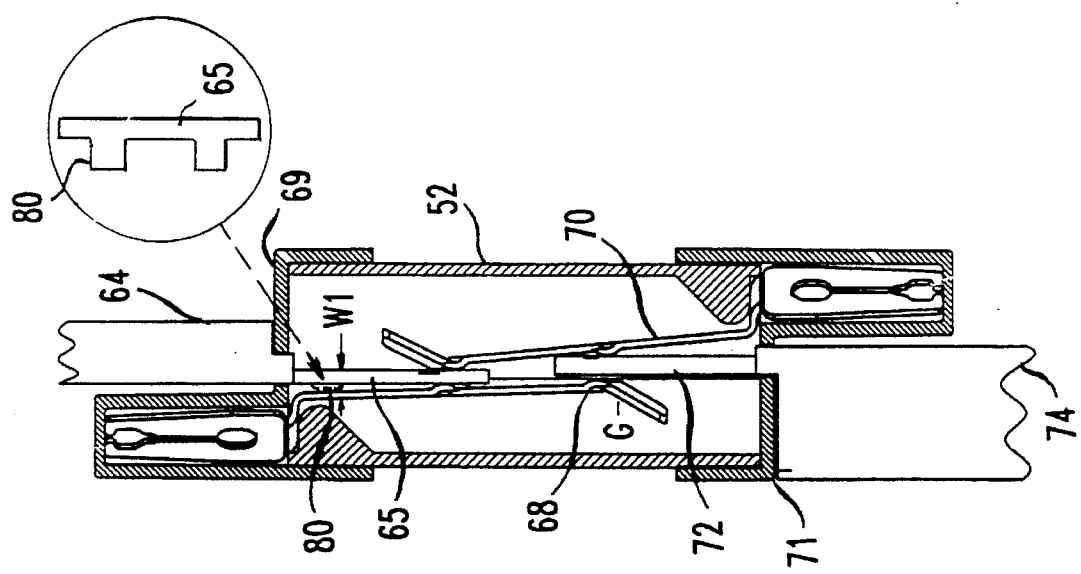
FIG. 4B shows a cross sectional view of a connector module having both a circuit protection module and a test plug installed therein.
Figure 4A:
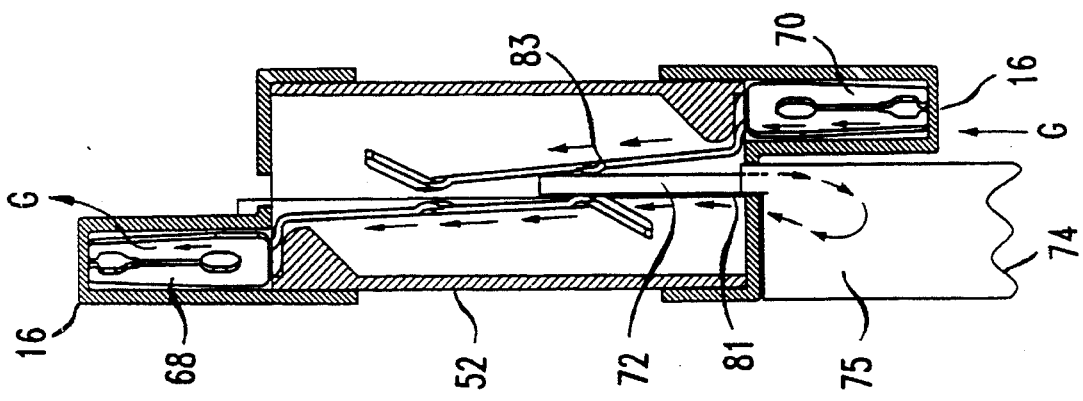
FIG. 4A shows one preferred embodiment of a connector module and protection module used in conjunction with the present invention connector.

Referring to FIG. 4A, there is shown a side cross-section of one preferred embodiment of a connector module 52. The connector module is shown with terminal caps 16 located on the front and rear side terminals 68, 70, respectively. Also included on the rear side 71 of the connector module is a single terminal pair protector unit 74. The single unit protector 74 is inserted within the rear of the connector module 52, wherein a conductor bar 72 from the protector makes contact with both the front and rear terminals 68, 70 of the connector module. Front 81 and rear sides 83 of the conductor bar which couple to the respective terminals 68, 70 of the connector module 52 are insulated from one another. A protection circuit is included in a cap region 75 of the protector module 74 to provide voltage and current limiting protection. FIG. 4 illustrates the direction of current flow from an incoming circuit which is terminated at the rear terminal 70 of the connector module. As can be seen the protector module 74 is inserted in series between the front and rear terminals 68, 70 and current is forced to flow through the circuit of the protection module. Insertion of the protector 74 thus causes a separation between the front and back terminals 68, 70 of the protector module so that current is forced to flow through the protector 74. FIG. 4 shows that the from and back terminals 68, 70 may be biased so as to create a normally closed contact, it will also be understood that the connector module may be fabricated so that front and rear terminals will be normally open, which may be preferred in some applications. Continuity can then be established between the two terminals by insertion of a protector module or other type of connecting plug.

Figure 5:
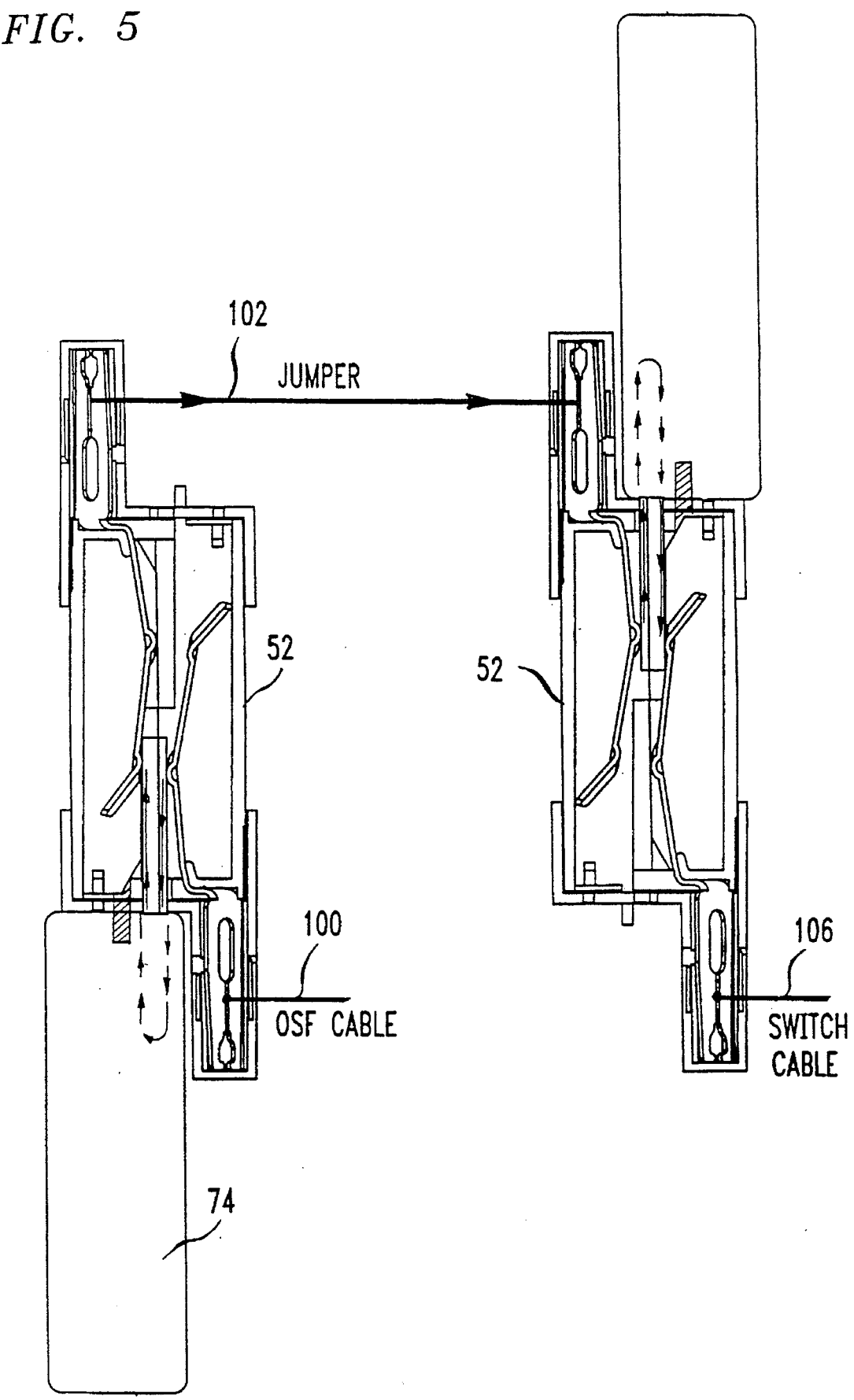
FIG. 5 illustrates an exemplary current path between connector modules.

FIG. 5 also illustrate a possible path of current flow between two separate connector modules. As can be seen current flows from an outside cable connection 100 at a rear terminal, through a rear mounted protector 74 and into a front terminated jumper 102. The current then flow into a font terminal on the connector module and through a front mounted protector module and then out through a switch cable 106. FIG. 5 is an illustration of the flexibility of the connector system.

Referring to FIG. 4B, a connector module 52 is shown having an individual protector 74 installed in the rear 71 of the module and a test plug 64 installed in the front side 69 of the module. A tab 80 is included in the conductive element 65 of the test plug 64 having sufficient width W1, to bias apart the terminals 68, 70 of the connector module 52 when the test plug is inserted. A gap G of predetermined width is created between the front facing terminal 68 of the connector module and the conductor bar 72 of the individual protector module 74 when the test plug 64 is inserted. The rear side terminal 70 (or cable termination side) remains coupled to the protector unit 74. The test plug, in a similar fashion to the circuit protection modules 74, 60, is inserted in series between the front and rear terminals 68, 70 of a connector pair. The test plug 64 and its associated circuitry will be adapted to test both in and out of circuit, i.e., provide test access to terminated cables inside the plant or outside cables terminated at the rear of a connector block. The test plug 64 may also provide the capability to establish a through connection between front and rear terminations to allow for monitoring. The above demonstrates the ability to test bi-directionally utilizing the test plug feature, while at the same time maintaining circuit protection on the rear or cable termination side of the connector block.

Referring to FIG. 4C, a cross section of the individual protector unit 74 is shown as the unit seats within the connector module 52. As can be seen the individual protector 74 includes a cavity 83 which is adapted to receive and mate with a ground bar 82 that couples to the mounting bracket 54 to thereby establish an electrical discharge path for the protector. The ground bar 82 as shown is designed to fit over the connector module 52 and a positive seat 84 on the ground bar will indicate when an individual protector is fully inserted. Individual protectors 74 and corresponding ground bars 82 are shown installed in both the front and rear of the connector module 52. This is done for illustration purposes to show the flexibility of the connector module system. Practical applications would normally require only that protection to be installed at one of these locations.

FIG. 4C also illustrates an exclusionary feature included on the connector modules 52 to ensure proper polarity insertion of the protection modules 74, 62. A key 86 on the connector module and slot 88 on the protector module are shown within the interior of an individual protector 74 which is to be installed on the rear of a connector module. Another corresponding key 90 and slot 92 is shown disposed at one end of an individual protector unit 77 which is to be installed in the front of a connector module 52. The exclusion feature ensures that current and voltage limiting protector units cannot be installed in the wrong orientation to thereby ensure proper polarities are followed. That is, the protection circuits of the voltage and current protection modules are required to be polarity specific to ensure proper operation and front-mounted and rear-mounted protection modules are not intended to be interchangeable. The voltage only protection modules can be inserted in either position.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A device for making an electrical connection to an insulated wire having a metallic conductor contained therein, said device comprising:

an essentially flat terminal element of electrically conductive material, said terminal element including:

a solid base region;

first and second arm sections extending upwardly from said base region, said arm sections having essentially equal and opposite geometries and defining a centralized slot in said terminal element, said slot being open at a top region thereof and having a width less than said metallic conductor of said insulated wire, wherein said arm sections include sharpened inside edges adapted to cut through insulation of said wire inserted in said slot to establish an electrical connection; and an opening, defined by said arm sections, in said base region of said terminal element adjoining said slot, said opening having a width greater than said width of said slot, wherein said opening adjoining said slot enables said sharpened edges of said arm sections to torsionally deflect upon a predetermined normal force being exerted by insertion of said wire into said slot; and a housing, including:

a base a plurality of vertical walls, extending from said base, adapted to retain said terminal element therebetween, wherein each of said vertical walls includes a region of a diminished thickness that facilitates said torsional displacement of said arm sections of said terminal element.

2. The device of claim 1, wherein said sharpened edges of said arm sections have length which is at least twice the diameter of said insulated wire, whereby a first and second wire may be terminated within said slot of said terminal element.

3. The device of claim 2, wherein said opening is slotted with generally rounded ends and includes a width which is greater than a diameter of said insulated wire, wherein said insulated wire connected within said slot may be slid downward into said opening for removal from said terminal element without disturbing other connections made at said terminal element.

4. The device according to claim 1, wherein said vertical walls of said housing define a channel therebetween and said vertical walls include means for mounting said terminal element at an angular offset relative said channel.

5. The device of claim 1, further including a widened entry region proximate said open end of said slot for receiving and holding said insulated wire prior to termination.

6. The device of claim 1, wherein said housing includes a plurality of said terminal elements disposed in a single row, wherein each said channel includes a single said terminal element.

7. The device of claim 6, wherein said housing is included as part of a connector module housing having a front and rear surface separated by a central region, wherein said plurality of terminal elements are disposed on said front and rear surface of said connector module housing.

8. The device of claim 1, wherein said housing includes a removable terminal cap having a plurality of slotted openings, wherein said terminal elements align with said slotted openings of said terminal cap and are recessed therein to thereby prevent disturbances to said connections made at said terminal elements.

9. The device of claim 1, wherein said terminal elements are adapted to receive wire in a range of 20–26 AWG.

10. An insulation displacement connector device for making an electrical connection to a metallic conductor having an insulated jacket, said connector device comprising:

an essentially U-shaped terminal element of a resilient conductive material, said terminal element including:

a base region;

first and second side members extending from said base region, said side members defining a centralized first slot in said terminal, said first slot being open at a top region thereof and having a predetermined width less than said metallic conductor, wherein said side members include sharpened inside edges adapted to cut through said insulated jacket of said conductor to thereby establish an electrical connection, said side members being operable to draw together in a spring-like manner when separated at a width greater than said predetermined width of said slot; and a second slot, defined by said side members, in said base region adjoining said first slot, said second slot having a width greater than said predetermined width of said first slot, wherein said second slot enables said sharpened edges of said side members to torsionally deflect upon insertion of said conductor into said first slot if said conductor into said first slot if said conductor exceeds a predetermined diameter, wherein said torsional deflection prevents a permanent yielding of said side members; and a housing including:

a base a plurality of vertical walls, extending from said base, adapted to retain said terminal element therebetween, wherein each of said vertical walls includes a region of a diminished thickness that facilitates said torsional displacement of said arm sections of said terminal element.

11. The device of claim 10, wherein said first slot has a length which is at least twice the diameter of said insulated wire, whereby a first and second wire may be terminated within said first slot of said terminal element.

12. The device of claim 10, wherein said vertical walls of said housing include means for mounting said terminal element at an angular offset relative an inserted conductor.

13. The device of claim 10, wherein said second slot is generally slotted with rounded ends and includes a width which is greater than an outermost diameter of an inserted wire, wherein said wire connected within said first slot may be slid downward into said second slot for removal from said terminal element without disturbing other connections made at said terminal element.

14. The device of claim 10, wherein said housing includes a plurality of said terminal elements disposed in a single row thereof.

15. The device of claim 14, wherein said housing couples to a connector module having a front and rear surface, wherein said plurality of terminal elements are disposed on said front and rear surface of said connector module.

16. A device for making an electrical connection to an insulated wire having a metallic conductor contained therein, said device comprising:

a plurality of terminal elements of electrically conductive material, each of said terminal elements including:
a solid base region;
first and second arm sections extending upwardly from said base region defining a centralized slot, said slot being open at a top region thereof and having a width less than said metallic conductor of said insulated wire, wherein said arm sections include sharpened inside edges adapted to cut through insulation of said wire inserted in said slot to thereby establish an electrical connection; and
an opening, defined by said arm sections, in said base region having a width greater than said width of said slot, wherein said opening enables said sharpened edges of said arm sections to torsionally deflect upon a predetermined normal force being exerted by insertion of said wire into said slot; and
a connector module housing, including:
a front and rear surface separated by a central region;
a plurality of vertical walls disposed on said front and rear surface, wherein adjacent vertical walls are separated by a predetermined distance and are adapted to securely hold said terminal elements in at least one row on said front and rear surface.

17. The device of claim 16, wherein said connector module housing includes a conductive member coupled to each of said terminal elements, each said conductive member extending within said central region of said connector module housing, wherein a conductive member from a corresponding one of said terminal elements on said front and rear surface of said connector module housing bias against one another thereby creating a normally closed contact.

18. The device of claim 17, wherein said connector module housing includes a plurality of receptacles in said front and rear side of said connector module housing, wherein said receptacles are adapted to receive current and voltage limiting circuit protection corresponding to pairs of said terminal elements which make contact at said conductive members, and wherein said conductive members include an angled rib at an end thereof for establishing a make before break connection with said circuit protection.

19. The device of claim 17, wherein said connector module is adapted to receive a test plug, wherein said test plug includes a stem insertable between said conductive elements of corresponding terminals, said stem having width so as to create a gap at an opposite end of said connector module between said corresponding terminals and one end of an inserted protector module.

20. The device of claim 16, wherein said connector module housing is adapted to be inserted into a mounting bracket, wherein a terminal block of terminal elements is formed from multiple inserted connector module housings.

21. The device of claim 16, wherein said connector module housing includes a conductive member coupled to each of said terminal elements, each said conductive member extending within said central region of said connector module housing, wherein a conductive member from a corresponding one of said terminal elements on said front and rear surface of said connector module housing remain normally open and a conductive path between corresponding terminal elements is established by insertion of a connecting element.

22. A device for making an electrical connection to an insulated wire having a metallic conductor contained therein, said device comprising:

at least one terminal element of electrically conductive material, each said terminal element including:
a solid base region;
first and second arm sections extending upwardly from said base region defining a centralized slot, said slot being open at a top region thereof and having a width less than said metallic conductor of said insulated wire, wherein said arm sections include sharpened inside edges adapted to cut through insulation of said wire inserted in said slot to thereby establish an electrical connection; and
an opening, defined by said arm sections, in said base region having a width greater than said width of said slot, wherein said opening enables said sharpened edges of said arm sections to torsionally deflect upon a predetermined normal force being exerted by insertion of said wire into said slot; and
a housing including:
a plurality of vertical walls separated by a predetermined distance, wherein adjacent vertical walls are adapted to securely hold a terminal element therebetween;
a removable terminal cap having a plurality of slotted openings, wherein each said terminal element aligns with one of said slotted openings and is recessed therein to thereby prevent disturbances to connections with said wire made at each said terminal element.

23. An insulation displacement connector device for making an electrical connection to a metallic conductor having an insulated jacket, said connector device comprising:

a plurality of essentially U-shaped terminal elements of a resilient conductive material, wherein each of said terminal elements includes:
a base region;
first and second side members extending from said base region, said side members defining a centralized first slot being open at a top region thereof and having a predetermined width less than said metallic conductor, wherein said side members include sharpened inside edges adapted to cut through said insulated jacket of said conductor to establish an electrical connection; and
a second slot, defined by said first and second side members, having a width greater than said predetermined width of said first slot, wherein said second slot enables said sharpened edges of said side members to torsionally deflect upon insertion of said conductor into said first slot if said conductor into said first slot if said conductor exceeds a predetermined diameter, wherein said torsional deflection prevents a permanent yielding of said side members
a connector module, including:
a front and rear surface separated by a central region;
a plurality of vertical walls disposed on said front and rear surface, wherein adjacent vertical walls are separated by a predetermined distance and are adapted to receive said terminal elements in at least one row on said front and rear surface.

24. The device of claim 23, wherein said connector module is adapted to be inserted into a mounting bracket, wherein a terminal block of said terminal elements is formed from multiple inserted connector modules.

* * * * *